United States Patent
Riedl

(10) Patent No.: US 6,994,325 B2
(45) Date of Patent: Feb. 7, 2006

(54) HEIGHT-ADJUSTABLE SUPPORT FOR SEMITRAILERS OR THE LIKE

(75) Inventor: Reinhold Riedl, Miltenberg (DE)

(73) Assignee: Georg Fischer Verkehrstechnik GmbH, Singen (DE)

(*) Notice: Subject to any disclaimer, the term of this patent is extended or adjusted under 35 U.S.C. 154(b) by 0 days.

(21) Appl. No.: 11/000,726

(22) Filed: Nov. 30, 2004

(65) Prior Publication Data

US 2005/0161656 A1    Jul. 28, 2005

(30) Foreign Application Priority Data

Jan. 24, 2004   (DE)   ................ 20 2004 001 054 U

(51) Int. Cl.
   *B60S 9/04*   (2006.01)
(52) U.S. Cl. .................... 254/419; 280/766.1
(58) Field of Classification Search ............... 254/419, 254/420–425, 100, 103; 280/766.1, 763, 280/765.1

See application file for complete search history.

(56) References Cited

U.S. PATENT DOCUMENTS

| 4,205,824 A * | 6/1980 | Mai ........................... 254/419 |
| 5,538,225 A * | 7/1996 | VanDenberg ............... 254/419 |
| 6,224,103 B1 * | 5/2001 | Hatcher ................... 280/766.1 |
| 2005/0161656 A1 * | 7/2005 | Riedl ......................... 254/419 |

* cited by examiner

*Primary Examiner*—Lee D. Wilson
(74) *Attorney, Agent, or Firm*—Bachman & LaPointe, P.C.

(57) ABSTRACT

A height-adjustable support for semitrailers, having a stationary outer support tube, an inner support tube, which is arranged in a longitudinally displaceable manner therein, and a gearbox output shaft, on which is seated in a rotationally fixed manner a bevel wheel of relatively small diameter which belongs to a bevel wheel gear stage which drives the spindle drive for the purpose of displacing the inner support tube. Two large-diameter gearwheels are arranged in a rotationally fixed manner on the gearbox output shaft, the gearwheel being located exclusively within the flux of force of the manual drive, which is initiated via the hand crank, and the gearwheel only transmitting the flux of force which is brought about by the motor, which, in a known manner, may be arranged inside or outside the support.

7 Claims, 2 Drawing Sheets

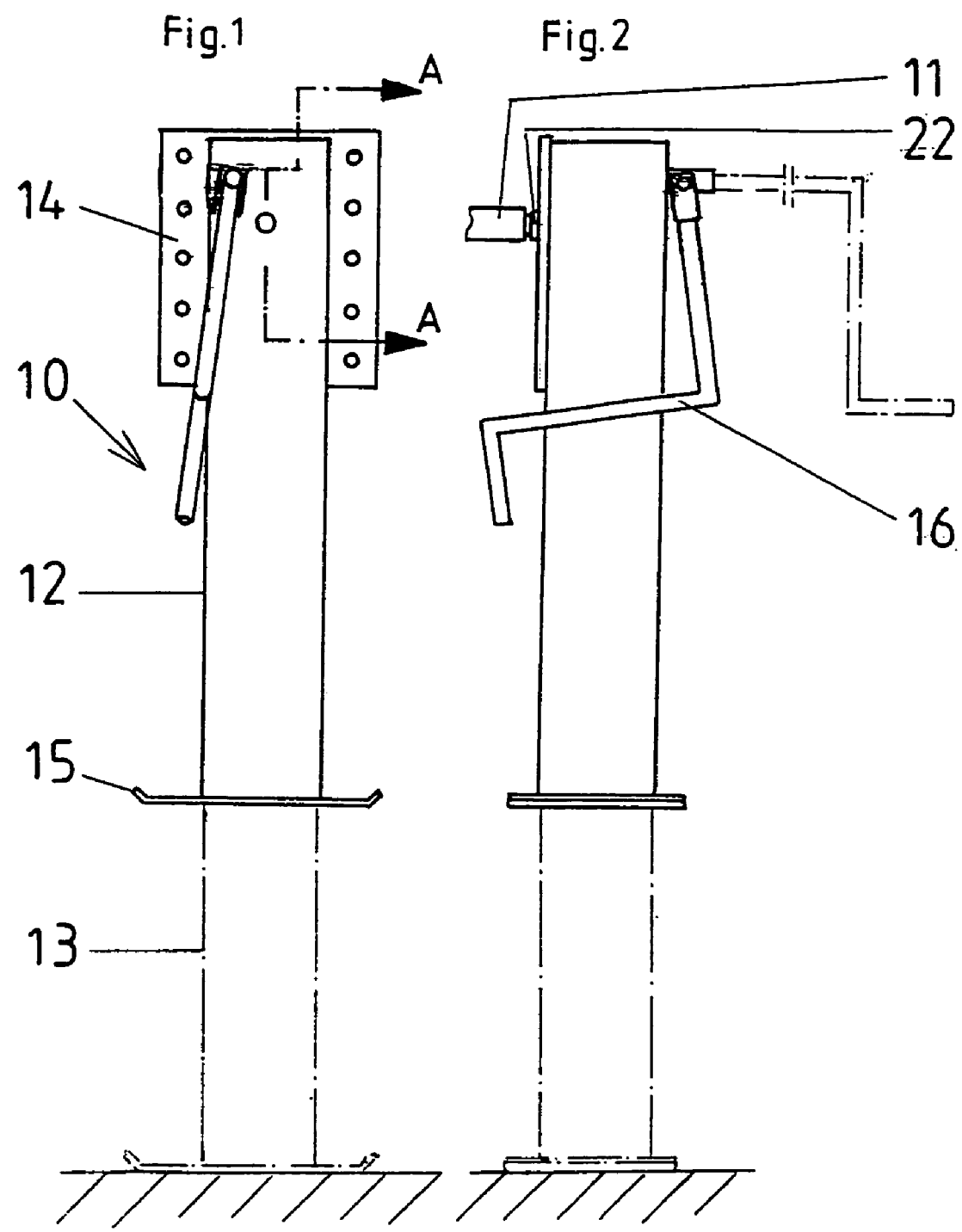

HEIGHT-ADJUSTABLE SUPPORT FOR SEMITRAILERS OR THE LIKE

BACKGROUND OF THE INVENTION

The invention relates to a height-adjustable support for semitrailers. Such supports, usually provided in pairs, are arranged at the front region of the semitrailer.

A support of the generic type is known from DE 203 07 381 U1. Here, a gearwheel is fastened in a rotationally fixed manner on the gearbox output shaft and is driven alternatively via a motor-drive pinion or a manual-drive pinion.

DE 20 2004 000 592.1 relates to a support in which, in accordance with DE 203 07 381 U1, in a known manner, it is also the case that just one gearwheel is seated in a rotationally fixed manner on the gearbox output shaft but is not just driven alternatively via a motor-drive pinion or a manual-drive pinion; rather, in another configuration, provision is also made for the gearwheel to be driven solely via the pinion seated on the motor.

In the case of the abovementioned gear-mechanism configurations, the presence of just one gearwheel, in respect of the variability in design, gives rise to a limitation in providing for the transmission ratios for the motor drive, on the one hand, and the manual drive, on the other hand. This may be a barrier to optimization in the case of motor selection and manual-drive configuration.

The object of the invention is to provide a support for semitrailers with an alternative motor drive and manual drive, the respective transmission ratios being capable of being varied and it thus being possible for the two drives to be configured optimally in terms of design and cost.

SUMMARY OF THE INVENTION

The foregoing object is achieved wherein the invention proposes to arrange two rotationally fixed gearwheels, preferably of different diameters, on the gearbox output shaft. In this case, it is possible to drive one of the gearwheels, preferably in permanent engagement with the motor-driven pinion. A manual-drive pinion, which may be switched on as an alternative, can engage in the other gearwheel in order to drive it. The corresponding switching mechanism can preferably be configured in accordance with DE 203 07 381 U1. As a modification to this configuration, however, it is proposed to mount the manual-drive pinion in a floating manner, this advantageously resulting in the greatest possible degree of freedom in respect of dimensioning the diameter of the motor-driven gearwheel. Since, according to the invention, in each case one of the gearwheels is located exclusively within the flux of force of the motor and the other gearwheel is only provided for the manual-drive train, optimum dimensioning of toothing formations can also take place. This is because, if motor operation is preferably provided just for the smooth-running rapid motion of the non-loaded support and the manual drive is only utilized for the load displacement, the toothing formation of the motor-driven pinion and gearwheel may be fine and narrow, only the teeth of the manually driven pinion and gearwheel having to be more robust. This renders production cost-effective.

Advantageous configurations of the invention will appear hereinbelow.

BRIEF DESCRIPTION OF THE DRAWINGS

The invention will be explained hereinbelow with reference to the drawings, in which:

FIG. 1 shows a front view of the support according to the invention,

FIG. 2 shows a side view of the support shown in FIG. 1,

DETAILED DESCRIPTION

Figure 3:
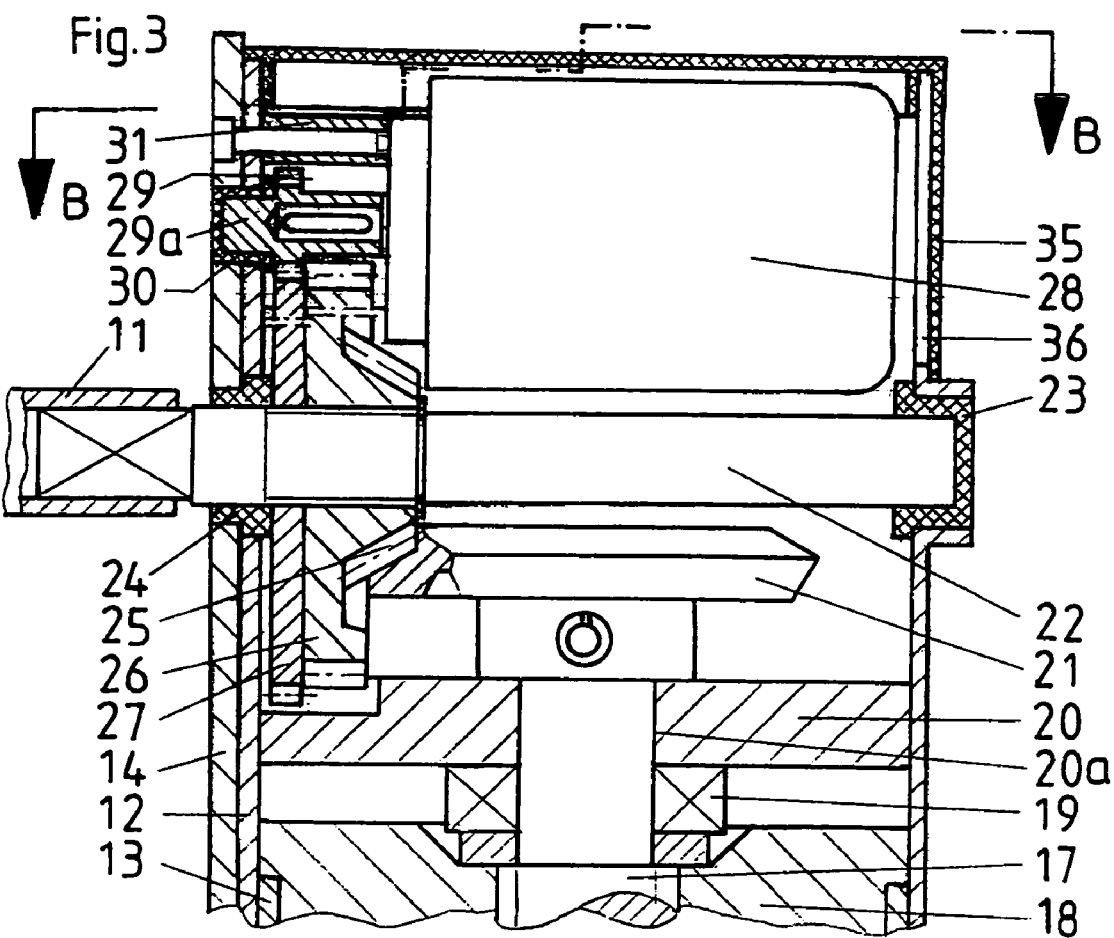
FIG. 3 shows a longitudinal section of the support along line A—A in FIG. 1.
Figure 4:
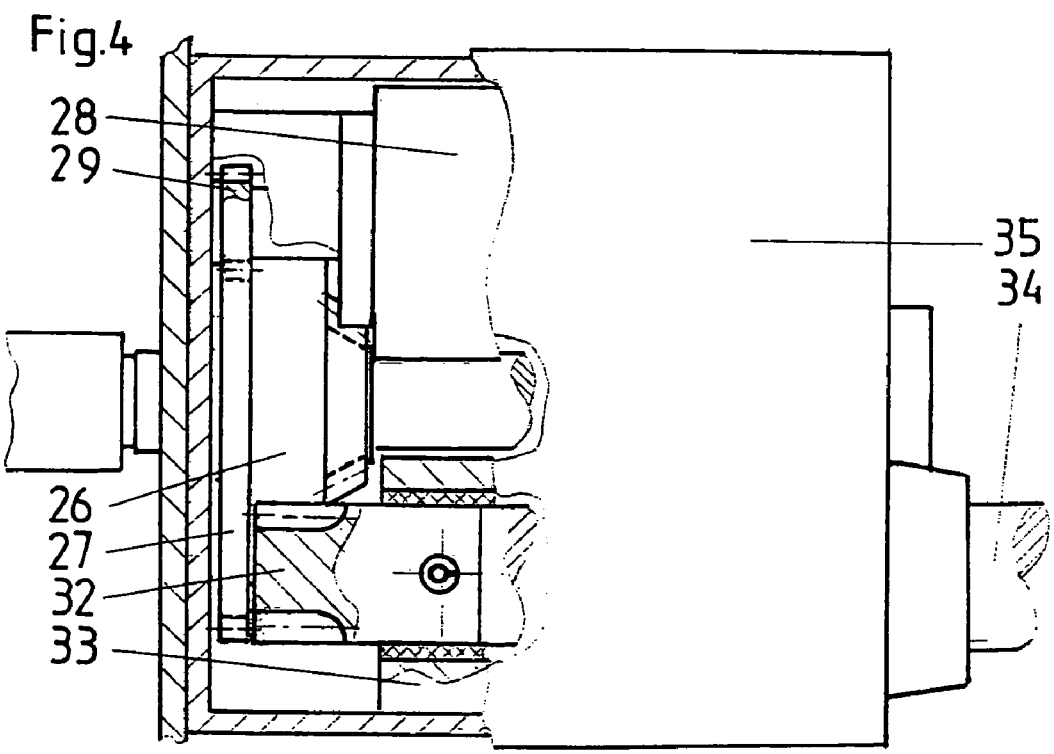
FIG. 4 shows a partial section/plan view of the support along line B—B in FIG. 3.

The support 10 shown in FIGS. 1 to 4 is fastened in a paired arrangement on the chassis of a semitrailer, in the front region thereof, and is retracted, i.e. in the shortened state, in the transporting position. The supports 10 are extended before the semitrailer is uncoupled from the articulated lorry.

Since the supports 10 of each pair are of more or less identical construction and because the second support, which is usually driven along by a first support 10 via a connection shaft 11, differs from the first support mainly just by way of a more straightforward gear mechanism, with only one bevel-wheel stage, it will suffice here to describe a drive-side support 10.

The support 10 has an outer support tube 12 and an inner tube 13 mounted in a longitudinally displaceable manner therein. The outer support tube 12 and the inner support tube 13 have a square cross section. The support 10 is fastened, on its rear side, on the semitrailer via a screw-on plate 14 seated on the outer support tube 12.

A foot 15 for support on the ground is fastened at the bottom end of the inner support tube 13. Located on the front side of the support 10 is a pivot-away hand crank 16 for the manual drive.

The support 10 has a spindle 17 with a nut 18. Seated on the shoulder of the spindle 17 is a disc, on which is located an axial bearing 19 which is supported on a bearing plate 20.

The bearing plate 20 is welded into the outer support tube 12 and has a bearing bore 20a passing through it in order to mount the spindle 17 radially. Located above the bearing plate 20, on a journal of the spindle 17, is a bevel wheel 21, which is pinned to this journal.

Arranged in the centre of the support 10, and above the bevel wheel 21, is a gearbox output shaft 22 which is mounted in the walls of the outer support tube 12, in an outwardly closed collared bushing 23 on the front side of the support 10 and in a collared bushing 24 on the rear side, projecting on the outside. A bevel wheel 25 of relatively small diameter and a gearwheel 26 and a gearwheel 27 are seated as a unit on the output side of the gearbox output shaft 22, on a multi-splined toothing formation. Located above the gearbox output shaft 22, parallel to the latter and in a laterally offset manner, is a motor 28, a pinion 29 being seated in a rotationally fixed manner on the drive shaft thereof.

The pinion 29 has, oriented away from the motor 28, a bearing journal 29a by means of which it is mounted in a closed collared bushing 30, seated in the wall of the outer support tube 12 and in the screw-on plate 14, and engages in the gearwheel 27.

The motor 28 is screw-connected against a flange segment 31 from the screw-on plate 14.

Also located above the gearbox output shaft 22, parallel to the latter and in a laterally offset manner opposite the motor 28, is a manual-drive mechanism which can be switched on/off by axial displacement and differs from the known manual-drive mechanism in accordance with the invention of DE 203 07 381 U1 by way of a pinion 32, which is mounted in a floating manner, and a separate mounting 33 for the manual-drive shaft 34.

Seated at the top end of the outer support tube 12 is a closure cap 35, which hermetically seals the cross section of the outer support tube and an installation cutout 36 for the motor 28, tube 12.

What is claimed is:

1. A height adjustable support comprising a stationary outer support tube, an inner support tube arranged in a longitudinally displaceable manner in the outer support tube, a gearbox output shaft mounted for rotational movement in the outer support tube, a bevel gear fixed to the gearbox output shaft, spindle drive means engaged with the bevel gear for displacing the inner support tube within the outer support tube, a first gearwheel fixed to the gearbox output shaft and engaging a manual drive means and a second gearwheel fixed to the gearbox output shaft and engaging a drive motor means.

2. A support according to claim 1, wherein the second gearwheel is arranged in the support on the front side or the rear side.

3. A support according to claim 1, wherein the drive motor is in permanent engagement with the second gearwheel.

4. A support according to claim 1, wherein the drive motor selectively engages with the second gearwheel.

5. A support according to claim 1 or 4, wherein the manual drive means comprises a pinion which is mounted in a floating manner for selective engagement with the first gearwheel.

6. A support according to claim 1, wherein the drive motor means comprises a pinion wherein the drive motor means pinion has a tooth width which is smaller than that of the manual drive means pinion.

7. A support according to claim 1, wherein the manual drive means comprises a hand crank and the drive motor means comprises an electric motor.

* * * * *